United States Patent [19]

Okochi et al.

[11] Patent Number: 4,964,158

[45] Date of Patent: Oct. 16, 1990

[54] POWER SUPPLY FOR TELEPHONE EXCHANGE

[75] Inventors: Sadao Okochi, Fussa; Kazuharu Ishii, Shiki, both of Japan

[73] Assignee: Kabushiki Kaisha Toshiba, Kanagawa, Japan

[21] Appl. No.: 273,164

[22] Filed: Nov. 14, 1988

Related U.S. Application Data

[63] Continuation of Ser. No. 924,809, Oct. 30, 1986, abandoned.

[30] Foreign Application Priority Data

Oct. 31, 1985 [JP] Japan .................. 60-245629
Oct. 31, 1985 [JP] Japan .................. 60-245630
Mar. 31, 1986 [JP] Japan .................. 61-073155

[51] Int. Cl.$^5$ ...................... H04M 19/00; H04M 3/00
[52] U.S. Cl. .................................. 379/322; 379/418;
379/413; 379/324; 323/266; 363/56
[58] Field of Search ............... 379/413, 324, 412, 418,
379/252, 253; 323/266; 363/41, 56, 124, 132

[56] References Cited

U.S. PATENT DOCUMENTS 3,970,916 7/1976 Kienscherf ..................... 363/41 X
4,220,826 9/1980 Kiss .................................. 379/418
4,239,935 12/1980 Bosik et al. ................. 379/418 X
4,264,786 4/1981 Yoshino et al. ................. 379/251
4,330,816 5/1982 Imazeki et al. ................. 363/56
4,341,928 7/1982 Stanson et al. ................. 379/418
4,404,623 9/1983 Jourdan ............................ 363/56
4,584,635 4/1986 MacInnis et al. ................. 363/25

FOREIGN PATENT DOCUMENTS 58-107757 6/1983 Japan .
58-151867 9/1983 Japan .
60-47540 3/1985 Japan .

OTHER PUBLICATIONS

"A Switched Mode Power Supply for the Pulse EPABX", A. Dvorak, Conference: INTELEC '78' International Telephone Energy Conference, Wash., D.C., USA, Oct. 25-27, 1978, pp. 140-143.
"Direct Off-Line Rectifier Units for Telecommunications Applications", G. Arnold, Conference: INTELEC '78, International Telephone Energy Conference, Wash., D.C., USA, Oct. 25-27, 1978, pp. 140-143.

Primary Examiner—Jin F. Ng
Assistant Examiner—Randall Vaas
Attorney, Agent, or Firm—Finnegan, Henderson, Farabow, Garrett and Dunner

[57] ABSTRACT

A power supply (ringer power supply) for a telephone exchange comprising a first switching circuit for receiving and subjecting direct current to high frequency switching by means of a switching element, a converter transformer connected to the switching circuit, a smoothing circuit connected to the secondary side of the converter transformer, a second switching circuit connected to the output stage of the smoothing circuit and used for switching the input current by means of a transistor bridge of a plurality of transistors for being alternately turned on, a direct-current bypassing diode connected between the input and output terminals of each transistor, a driving circuit for driving each of the transistors in accordance with a predetermined driving signal, and a driving signal generator circuit for generating the driving signal for setting timing to prevent the period during which a transistor is turned on from overlapping the one during which another transistor is subsequently turned on, permitting a reduction in the size of the converter transformer for switching purposes and the current transformer for detecting current.

16 Claims, 16 Drawing Sheets $r = R_a + R_b + R_D$ (BUT m > k+n > 0)

POWER SUPPLY FOR TELEPHONE EXCHANGE

This application is a continuation of application Ser. No. 924,809, filed Oct. 30, 1986, now abandoned.

The present application claims priority of Japanese Patent Application No. 60-245629 and No. 60-245630 filed on Oct. 31, 1985 respectively and No. 61-073155 filed on Mar. 31, 1986.

FIELD OF THE INVENTION AND RELATED ART STATEMENT

This invention relates to a power supply for a telephone exchange and, more particularly, to a power supply of the sort installed in a telephone exchange and used to ring telephones (hereinafter called the "ringer power supply").

FIG. 39 shows the construction of a conventional telephone exchange.

The telephone exchange shown in FIG. 39 comprises a DC/AC inverter I for switching direct current derived from a DC power supply $E_1$ ($-48$ V) and converting it into a current of low frequency (20 Hz), an output transformer T of the DC/AC inverter, a telephone D, a relay R for switching the connection of the telephone D from the channel to the output transformer line and vice versa, a detection circuit L for detecting the off-hook state (the state in which the receiver is left off the cradle) of the telephone D and a control circuit CONT, which will be described later.

In the above telephone exchange, the control circuit CONT causes the relay R to make the connection of the telephone D to the terminal B when the telephone D is called up and an AC of 85 V/20 Hz is thus supplied from the output transformer T to the telephone D. The bell (whose resistance is 10 k$\Omega$) of the telephone D is thereby called and the control circuit CONT causes the relay to make and brake the connection thereof to the terminals A, B at fixed intervals to ring the bell of the telephone D intermittently until the receiver is left off the cradle.

When the receiver of the telephone D is left off the cradle, the resistance of the bell is canceled, whereas the detection circuit L detects the voltage change accompanied by the charged state of a capacitor C. On receiving a signal from the detection circuit L, the control circuit CONT locks the armature of the relay to the terminal A.

Assuming a plurality of telephones D are connected to the telephone exchange, AC voltage supplied to each telephone D drops, thus making the detection circuit L incapable of properly detecting the on/off-hook state of the telephone D.

A DC power supply $E^2$ ($-48$ V) is accordingly connected between the output transformer T and the terminal B of the relay R in the conventional telephone exchange to bias the AC voltage.

However, the conventional ringer power supply has posed a problem in that the output transformer T of the DC/AC inverter I is extremely large-sized. A description will subsequently be given of the above problem of size.

The transformer core size S is generally expressed by $$A_e \times A_w$$

where $A_e$ (cm$^2$)=cross-sectional area of the core; and $A_w$ (cm$^2$)=total window area.

Given the input voltage is V (volts); the switching frequency is fHz; the magnetic flux density is B(G); and the number of primary winding turns of the transformer is $N_p$ in turns, the following equation is applicable:

$$V = 4 \times f \times B \times A_e \times N_p \times 10^{-8}$$

On the other hand, the equation shown below holds between the primary and secondary windings, provided that the loss in the transformer is negligible:

$$N_p \times I_p = N_s \times I_s$$

where primary current=$I_p$ in amps; secondary current=$I_s$ in amps; and number of secondary winding turns=$N_s$ turns.

Moreover $$\delta = (N_p \times I_p + N_s \times I_s)/A_c$$

where $A_c$=total sectional area of the primary and secondary windings in cm$^2$; and $\delta$=winding current density in amps per square meter. Given that the copper wire occupying factor is $\beta$ ($=A_c/A_w$), $$A_c = \beta \times A_w = (2 \times N_p \times I_p)/\delta$$

The above equation can be changed into $$I_p = (\delta \times \beta \times A_w)/(2 \times N_p)$$

Given the maximum input of the transformer is P volt-amps (VA), $$P = V \times I_p = 2 \times \delta \times \beta \times B \times f \times A_e \times A_w \times 10^{-8}$$

Accordingly, the core size is determined by $$A_e \times A_w = P/(2 \times \delta \times \beta \times B \times f \times 10^{-8})$$

However, if a switching power transistor is operated at low frequencies, the above f becomes small and $A_e \cdot A_w$, i.e., the transformer core size becomes large.

Furthermore, the superposition of the direct current on the output stage of the DC/AC inverter I (the output line of the output transformer) makes the size of the transformer of the DC/AC inverter I larger.

When the direct current is superposed on the output of the DC/AC inverter I, there develops such nonuniformity that the inverter transformer is unevenly magnetized for the following reasons:

A push-pull inverter is employed in this case as shown FIG. 40.

(1) When the transistor $Q_1$ is turned on, voltage $V_2$ is generated in the secondary coil of the transformer T. The secondary coil current $I_{s1}$ becomes $$I_{s1} = \frac{V_2 - E_2}{Z}$$

where Z=impedance in the secondary circuit.

(2) When the transistor $Q_2$ is turned on, current $I_{s2}$ flowing through the secondary circuit because of the voltage generated in the secondary coil of the transformer T becomes $$I_{s2} = \left| -\frac{V_2 + E_2}{Z} \right| = \frac{V_2 + E_2}{Z}$$

(3) Therefore, given that the collector currents of $Q_1$, $Q_2$ are $I_{p1}$, $I_{p2}$, $$I_{p1} = n\, I_{s1} = n\frac{V_2 - E_2}{Z}$$

$$I_{p2} = n\, I_{s2} = n\frac{V_2 + E_2}{Z}$$

provided the turn ratio of the transformer is 1:n.

(4) In consequence, voltage VT applied to the primary coil of the transformer is:
when $Q_1$ is turned on, $$V_{T1} = E - I_{p1}(\nu_1 + \nu_{t1})$$

when $Q_2$ is turned on likewise, $$V_{T2} = E - I_{p2}(\nu_2 + \nu_{t2})$$

where $\nu_1$, $\nu_2$ = internal resistances of transistors $Q_1$, $Q_2$; $\nu_{t1}$, $\nu_{t2}$ = the primary coil of the transformer. Even though variation in the constant of the part on the primary side is negligible, $V_{T1} > V_{T2}$ and voltage $\Delta V_T = V_{T1} - V_{T2}$ as a DC voltage component is applied to the coil of the transformer every period of switching. DC magnetic flux is applied while $Q_1$ is held on and the core is unevenly magnetized.

The B-H curve of the transformer core will not form a loop centering around the origin (FIG. 41) but normally around a deflected point (FIG. 42) if alternating current is used for excitation after the superposition of direct current. In consequence, the saturated magnetic flux density of the transformer core must be made greater, which in turn makes the size of the transformer larger.

As shown in FIG. 43, to stabilize the output of the switching element of the DC/AC inverter I through duty factor feedback control, a current transformer CT must be installed on the primary or secondary side of the output transformer T. However, the existing problem is that, if the switching frequency is low, the size of the current transformer CT also becomes large.

OBJECT AND SUMMARY OF THE INVENTION

The present invention is intended to solve the above problems and it is therefore an object of the invention to provide a ringer power supply whose output transformer for switching and current transformers for detecting current are extremely small-sized.

The ringer power supply embodying the present invention comprises a first switching circuit for receiving and subjecting direct current to high frequency switching by means of a switching element, a converter transformer connected to the first switching circuit, a smoothing circuit connected to the secondary side of the converter transformer, a second switching circuit connected to the output stage of the smoothing circuit and used for switching the input current by means of a transistor bridge consisting of a plurality of transistors for being alternately turned on, a direct-current bypassing diode connected between the input and output terminals of each transistor, a driving circuit for driving each of the transistors in accordance with a predetermined driving signal, and a driving signal generator circuit for generating the driving signal for setting timing to prevent the period during which a transistor is turned on from overlapping the one during which another transistor is subsequently turned on.

DETAILED DESCRIPTION OF PREFERRED EMBODIMENTS

Referring now to the accompanying drawings, a power supply for a telephone exchange according to the present invention will be described.

Figure 1:
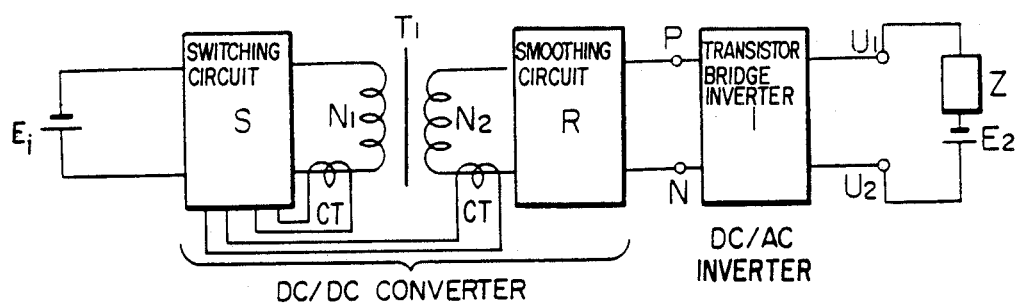
FIG. 1 is a circuit diagram showing the construction of a ringer power supply embodying the present invention.

FIG. 1 is a circuit diagram showing the overall construction of a power supply embodying the present invention.

Figure 2:
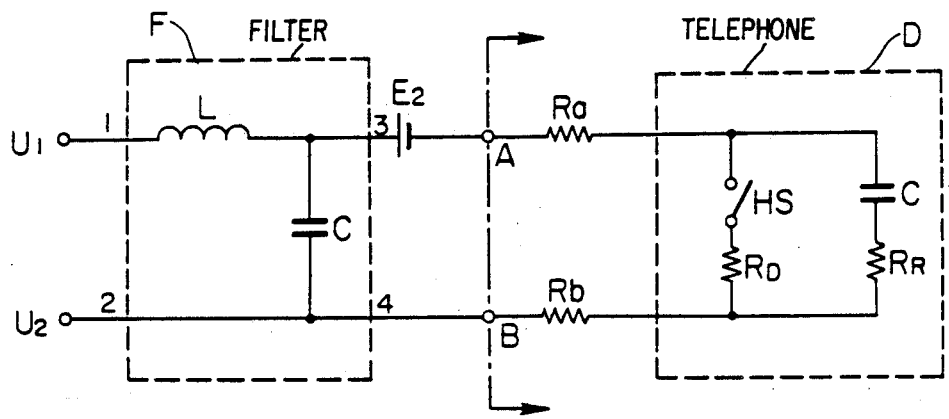
FIGS. 2 and 3 are diagrams illustrating examples of the filter used in the telephone exchange.
Figure 3:
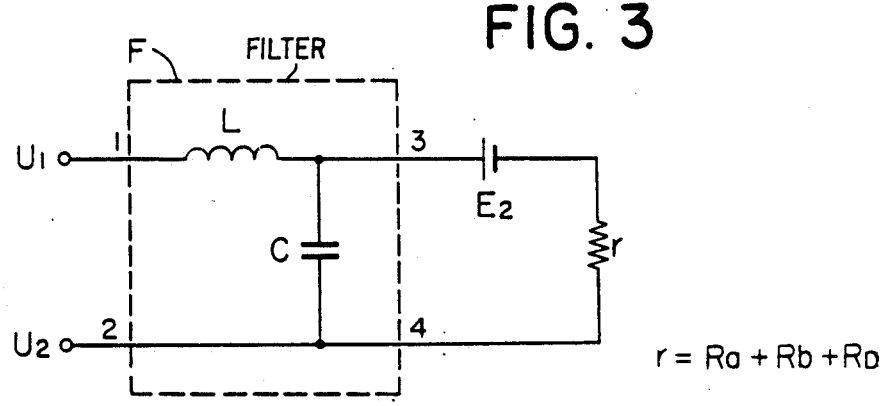
Figure 39:
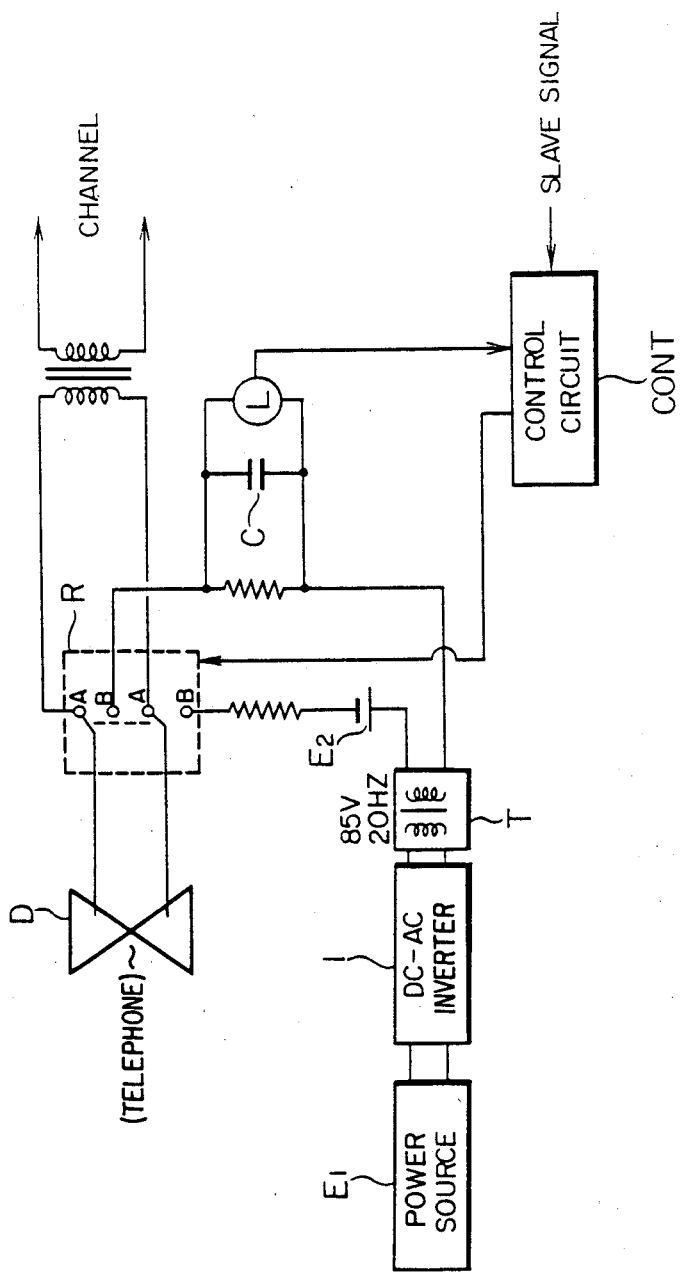
FIG. 39 is a circuit diagram showing a conventional telephone exchange.
Figure 40:
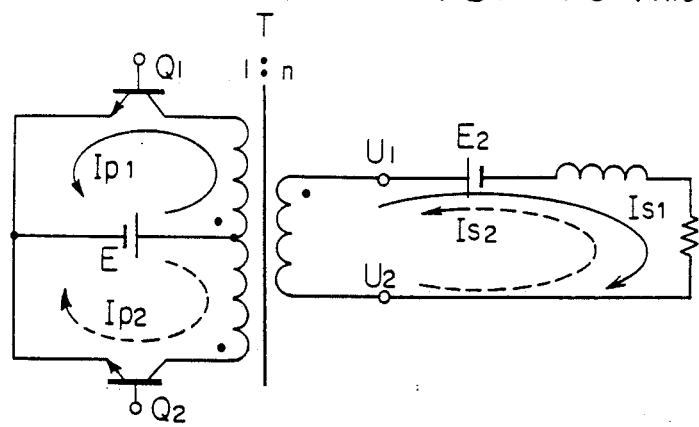
FIG. 40 is diagram illustrating the construction of the general push-pull type inverter.
Figure 41:
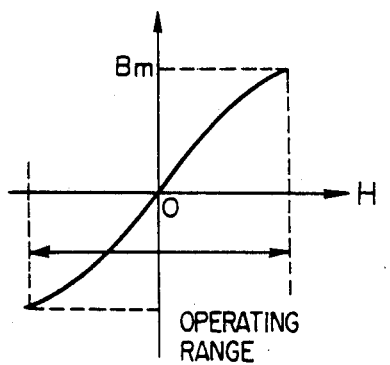
FIGS. 41 and 42 are diagrams illustrating the reason that the transformer in the conventional telephone exchange inevitably becomes large-sized.
Figure 42:
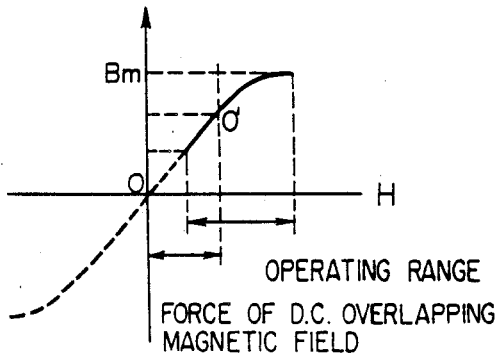
Figure 43:
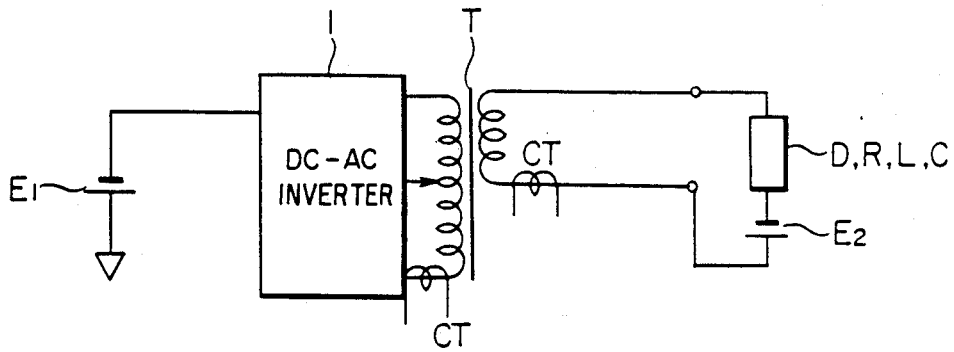
FIG. 43 is a diagram showing the position of a current transformer fitted in the conventional telephone exchange.

In FIG. 1, there is shown an arrangement of a DC power supply $E_1$, a switching circuit S mainly consisting of power transistors, a (converter) transformer $T_1$ connected to the switching circuit S, a current transformer CT for detecting current flowing through the primary coil $N_1$ or secondary coil $N_2$ of the transformer $T_1$, a smoothing circuit R, a DC/AC inverter I formed with a transistor bridge without employing a transformer as will be described later, DC input terminals P and N of the DC/AC inverter I, and AC output terminals $U_1$, $U_2$ of the DC/AC inverter I. According to this example, the output of the inverter I is assumed to be in the form of a square wave. When such a waveform is utilized, high frequency noise at the time of switching is conducted from the output to the telephone circuit and may interfere with the operation of other equipment. It is therefore necessary to use a filter for removing the high frequency noise shown by a symbol F of FIG. 2 when such a square wave output is produced. The circuit shown in FIG. 2 also includes resistors $R_a$, $R_b$ in an off-hook detection circuit shown in FIG. 39, a telephone D, a DC blocking capacitor C, an equivalent resistor $R_R$ in a bell sounding circuit, a talking circuit $R_D$ connected in parallel with C and $R_R$ at the time of off-hook, C, $R_R$ and $R_C$ being contained in the telephone. $E_2$ is similar to what is shown in FIG. 39. Since the impedance in the telephone at the time of off-hook is $$R_D << \sqrt{\left(\frac{1}{\omega c}\right)^2 + R_R^2}$$

the circuit shown in FIG. 2 may be simplified as shown in FIG. 3 at the time of off-hook, where $\gamma = R_a + R_b + R_D$.

The load circuit thus composed of $R_a$, $R_b$ and the telephone D allows over N units of telephone to be simultaneously called and, provided N units of telephones are in the off-hook state, the N units of telephones are practically connected in parallel in the portion right to the points A, B.

When the maximum load is applied, the inverter is subjected to the most severe operating condition. Accordingly, the operation thereof under the severe condition will subsequently be examined.

Figure 4:
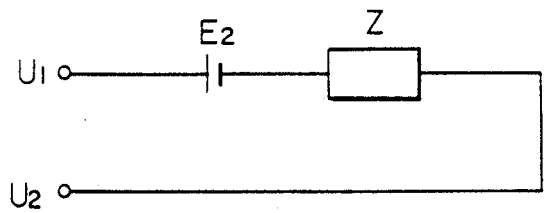
FIG. 4 is a diagram illustrating the off-hook state as a circuit.
Figure 5:
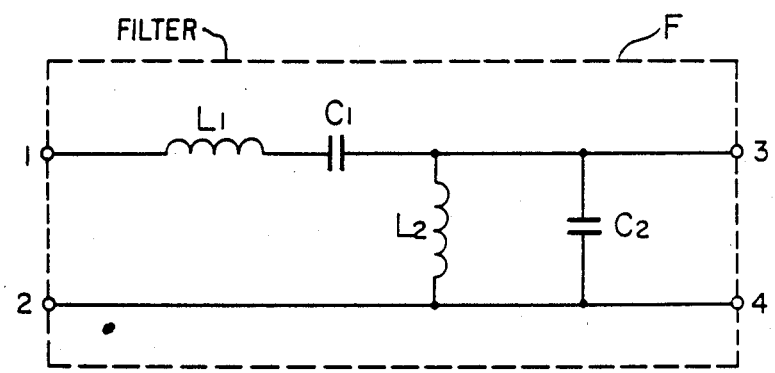
FIGS. 5 and 6 are diagrams illustrating other examples of the filter used in telephone exchange.
Figure 6:
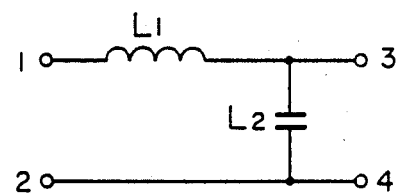
Figure 7:
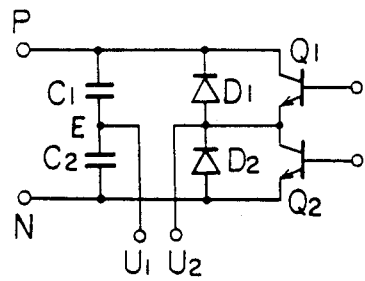
FIG. 7 is a circuit diagram showing a first configuration of the inverter in the embodiment thereof.
Figure 26:
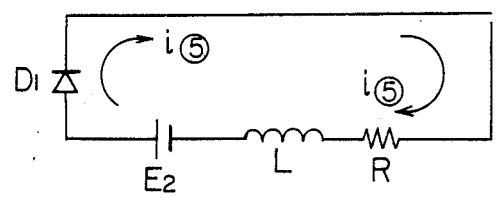
FIGS. 26 and 27 show the current flow and circuit characteristics in accordance with the period ⑤ in FIG. 16(a).

As shown in FIG. 4, the state in which a maximum load is applied at the time of off-hook is represented by impedance Z. In other words, the impedance Z is derived from a filter F and a load equivalent to what is multiplied by N ($\gamma$ per unit) as shown in FIG. 23(b). The above description is based on the fact that the waveform of the voltage applied by the inverter to the load is square. However, it may be preferred to apply sine wave voltage, instead of square wave voltage, to the telephone circuit. In this case, e.g., a dominant wave resonant filter shown in FIG. 5 is required as the filter F of FIGS. 2, 3. Consequently, the filter elements are arranged so that the inductance and capacitance may satisfy the requirements: $\omega^2 L_1 C_1 = 1$, $\omega^2 L_2 C_2 = 1$, where $\omega$ = basic angular frequency. Since the input voltage waveform is square, however, high frequency waves are contained as shown in FIGS. 3, 5, 7 ... The operation of the circuit elements shown in FIG. 5 may be examined by partly omitting those high frequency waves, i.e., $$k\omega_1 L_1 > \frac{1}{k\omega_1 C_1}$$

$$k\omega_1 L_2 > \frac{1}{k\omega_1 C_2}$$

provided the degree of the high frequency is k. $C_1$ and $L_2$ can thus be omitted against $L_1$ and $C_2$ respectively, so that the circuit configuration is simplified as shown in FIG. 26. The filter of FIG. 5 is accordingly considered the same in configuration as the LC filter F of FIGS. 2, 3 when the high frequency component is examined. As to the short period of the switching operation of the inverter, it should be reviewed how the component of the current flowing through the inverter changes is examined. Consequently, the operation in the case of FIG. 6 can be deemed likewise if the load in FIGS. 2,3 is taken into consideration.

Referring to FIG. 3, the circuit in question will be examined further. As FIG. 4 shows a simplified version of what is shown in FIG. 3, it is only necessary to consider the configuration of FIG. 4 in reference to FIGS. 2, 3. In order to facilitate the understanding of the operation of the circuit in the following description of the waveform, L and $\gamma$ in Z will be referred to while C is ignored.

In that circuit, the voltage from the DC power supply $E_1$ is converted by the switching elements of the switching circuit S into what has a square wave with a switching frequency of 15 kHz or more.

The square wave voltage is applied to the primary winding $N_1$ of the transformer $T_1$ and, after being subjected to voltage transformation, sent out of the secondary winding $N_2$.

The voltage thus produced is supplied to the smoothing circuit R and converted into DC voltage. The DC voltage is further converted by the DC/AC inverter I into low frequency alternating current, which is sent out of $U_1$ and $U_2$ to the load circuit Z.

In the above-described embodiment, direct current having desired voltage is obtained through the high frequency (over 15 kHz) switching carried out by the DC/DC converter consisting of the switching circuit S, the transformer $T_1$ and the smoothing circuit R, whereas desired low frequency alternating current is obtained in the DC/AC inverter I formed with a transistor bridge, whereby the power supply can be made compact because only the small transformer $T_1$ for the DC/AC converter is required.

In the above-described embodiment, moreover, the current in the high frequency switching means switching circuits is detected by providing the current transformer on the primary or secondary side of the transformer $T_1$ and, to stabilize the output, the current is so controlled that it is rectified and smoothed before being fed back by an amplifier to the oscillation circuit of the DC/DC converter.

In other words, since the current transformer CT is in a high frequency portion of the circuit rather than a low frequency portion as in conventional power supplies, the transformer size can be minimized, which therefore contributes to making the power supply smaller.

FIG. 7 is a circuit diagram showing, in concrete terms, the configuration of the DC/AC inverter I of FIG. 1.

In FIG. 7, there is shown a so-called half-bridge type inverter consisting of input terminals P, N, capacitors $C_1$, $C_2$ for halving the supply voltage, power transistors $Q_1$, $Q_2$, and diodes $D_1$, $D_2$ respectively connected in parallel between the input and output terminals (the emitters and collectors) of the power transistors $Q_1$, $Q_1$ to regenerate magnetic energy to be stored in the inductance L connected to the output side of the inverter and allows the DC component derived from the DC power supply $E_2$ to flow while it is superposed on the alternating current.

The input voltage is halved by the capacitors $C_1$, $C_2$ of the same capacitance.

When the power transistors $Q_1$, $Q_2$ are turned on and off, square waves with $\frac{1}{2}$ of the input voltage as an amplitude are obtained from the output terminal (the emitter of the power transistor).

Figure 8:
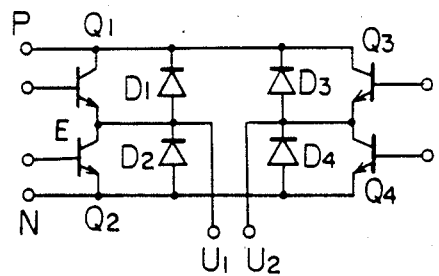
FIG. 8 is a circuit diagram showing a configuration of the inverter in the second embodiment thereof.

FIG. 8 is a diagram showing another example of the inverter of FIG. 1 consisting of input terminals P, N, power transistors $Q_1 \sim Q_4$, diodes $D_1 \sim D_4$ are for regenerating magnetic energy to be stored in the inductance L connected derived from the DC power supply $E_2$ to flow while it is superposed on the alternating current. The above circuit is a full-bridge type inverter.

In that circuit, the input voltage is so applied to a load that the output terminal $U_1$ is made positive and the output terminal $U_2$ negative for the period during which the power transistors $Q_1$, $Q_4$ are held on and that the former $U_1$ is made negative and the latter $U_2$ positive for the period during which the power transistors $Q_2$, $Q_3$ is held on. The square wave voltage is thus generated at the output terminals $U_1$, $U_2$.

Figure 9:
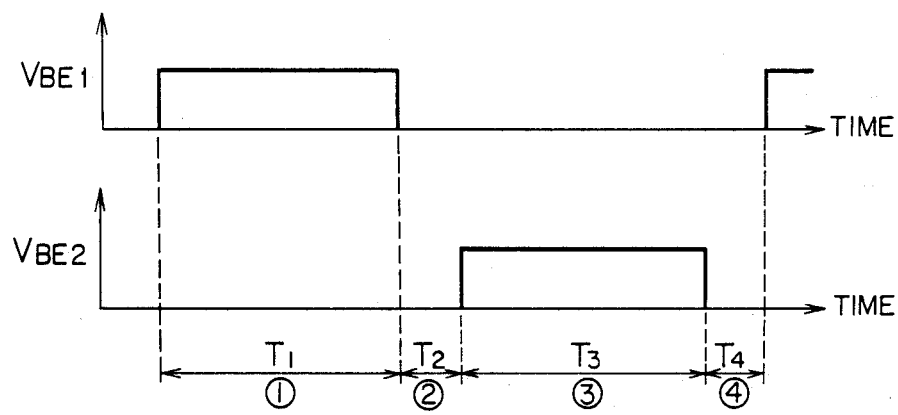
FIG. 9(a) is a time chart showing the ON/OFF time relation between the transistors in the circuit of FIG. 7.
FIG. 9(b) is a time chart showing the ON/OFF time relation among the transistors in the circuit of FIG. 8.
Figure 9:
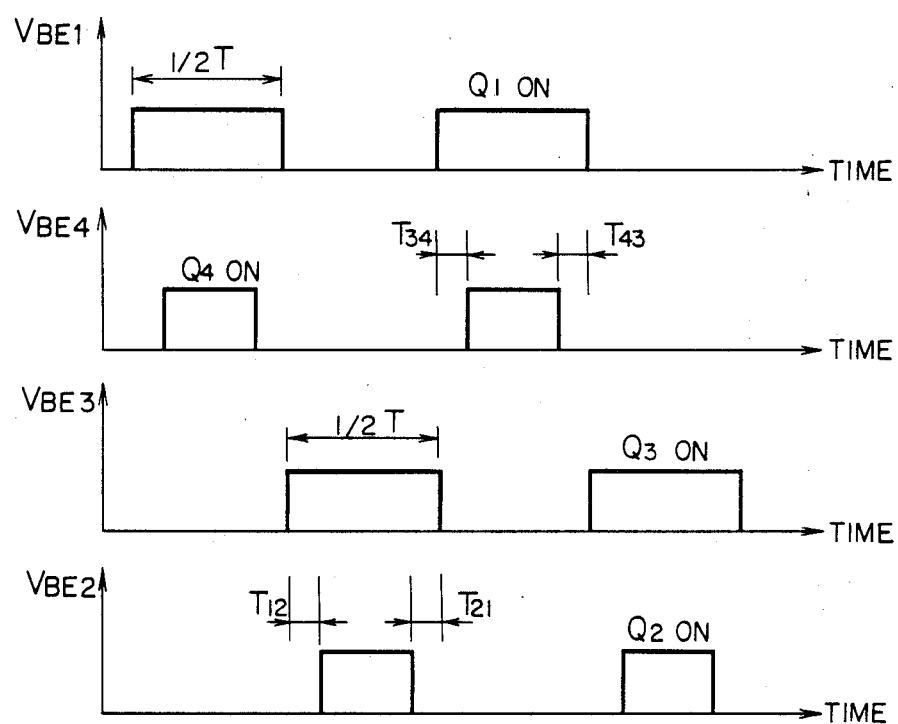

FIG. 9(a) is a time chart showing the ON-time relation between the power transistors $Q_1$, $Q_2$ in the half-bridge type inverter of FIG. 7.

Both the power transistors $Q_1$, $Q_2$ are held off during a "dead time". The dead time is set up to avoid a short between the terminals P, N when the power transistors $Q_1$, $Q_2$ are simultaneously turned on because of the storage time of each.

Referring to FIG. 9(a), the waveform of the current flowing through the circuit will be described.

Figure 10:
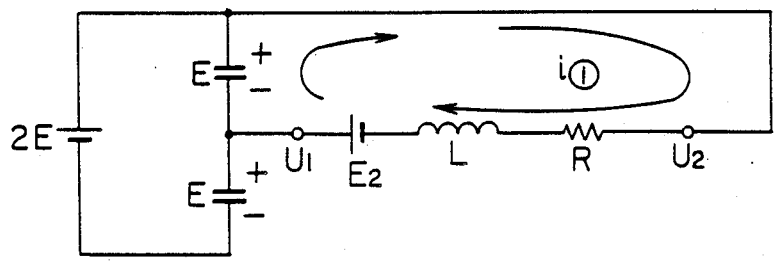
FIG. 10 is a diagram showing a direct current flow in the circuit of FIG. 8.

1. During the period ①:
$Q_1$ is turned on and the current given by $$i_1 = \frac{E + E_2}{R}(1 - \epsilon^{-\frac{R}{L}t}) + i_4 f \epsilon^{-\frac{R}{L}t}$$

flows as shown in FIG. 10, where $i_④ f$ = final value of the current $i_④$ in the preceding period ④. Assuming that the period ① continues from $t=0$ up to $t=t_1$ and the value $i_①$ at $t=t_1$ is $i_1 f$ as the final value of $i_①$, $$i_1 f = \frac{E + E_2}{R}(1 - \epsilon^{-\frac{R}{L}t_1}) + i_④ f \epsilon^{-\frac{R}{L}t_1}$$

Since $\epsilon^{-\frac{R}{L}t_1} \approx 0$ is considered generally applicable, $$i_① f \approx \frac{E + E_2}{R}$$

Figure 11:
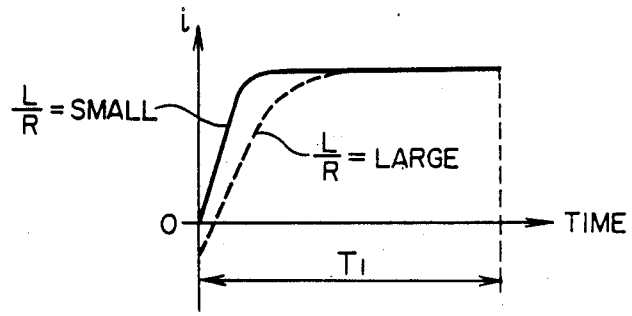
FIG. 11 is a diagram showing the characteristics of the circuit of FIG. 10 different ratios of L/R.

FIG. 11 shows the difference between the waveforms when L/R is large and small, respectively.

Figure 12A:
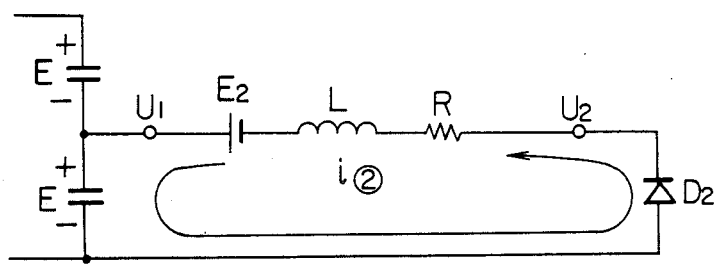
FIGS. 12(a) and (b) show a current flow and circuit characteristics in accordance with period 2 in FIG. 9(a).

2. During the period of ②: FIGS. 12(a), (b) $i_②$ flows through the route of FIG. (a) and expressed by $$i_② = \frac{E - E_2}{R}(1 - \epsilon^{-\frac{R}{L}t}) + i_① f \epsilon^{-\frac{R}{L}t}$$

The final value is $$i_② f = \frac{E - E_2}{R}(1 - \epsilon^{-\frac{R}{L}t_2}) + i_① f \epsilon^{-\frac{R}{L}t_2}$$

Figure 13A:
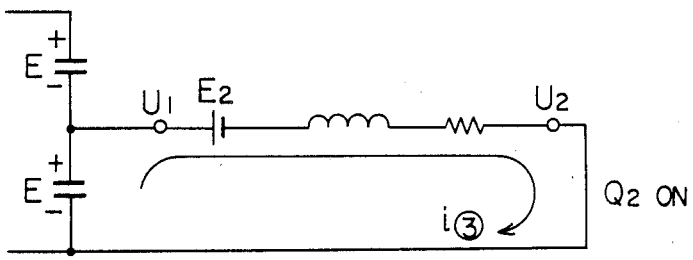
FIGS. 13(a) and (b) show a current flow and circuit characteristics in accordance with period 3 in FIG. 9(a).

3. During the period of ③: FIGS. 13(a), (b)
$Q_2$ is turned on and $i_③$ flows the route of FIG. 13(a) and is expressed by $$i_③ = -\frac{E - E_2}{E}(1 - \epsilon^{-\frac{R}{L}t}) + i_② f \epsilon^{-\frac{R}{L}t}$$

and, since the final value is considered, $$i_③ f = -\frac{E - E_2}{R}$$

Figure 14A:
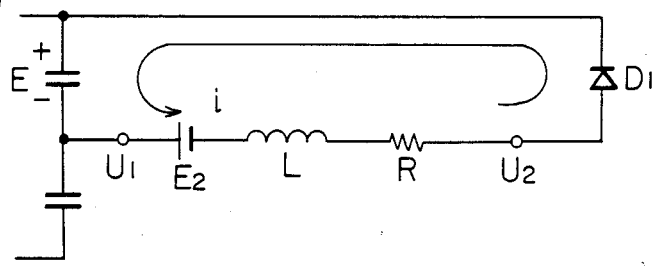
FIGS. 14(a) and (b) show a current flow and circuit characteristics in accordance with period 4 in FIG. 9(a).
Figure 14B:
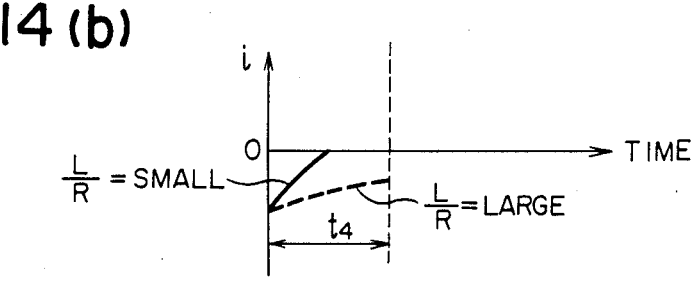

4. During the period ④, FIGS. 14(a), (b)

$$i_④ = \frac{E + E_2}{R}(1 - \epsilon^{-\frac{R}{L}t}) + i_③ f \epsilon^{-\frac{R}{L}t}$$

the magnetic energy stored in the inductance L is expressed by $(\frac{1}{2})Li_④^2$.

(i) When L/R is small; $i_④ = 0$ at $0 \leq t \leq t_4$ halfway. Therefore, the magnetic energy will completely be released at the point of time $i_④ = 0$. No electromotive force for turning on $D_1$ exists in the circuit thereafter and $D_1$ is held off.

(ii) When L/R is large; $i_④ < 0$ even at $t = t_4$ during the $0 \leq t \leq t_4$ period.

In this case, the magnetic energy of L has not completely been released and $D_1$ is held on during the $t_4$ period.

(iii) In consequence, $$i_{\textcircled{4}}f =$$

$$\begin{cases} 0 \ldots & \text{(when } L/R = \text{small)} \\ \frac{E + E_2}{R}(1 - \epsilon^{-\frac{R}{L}t_4}) + i_{\textcircled{3}}f\epsilon^{-\frac{R}{L}t_4} & \text{(when } L/R = \text{large)} \end{cases}$$

Figure 15A:
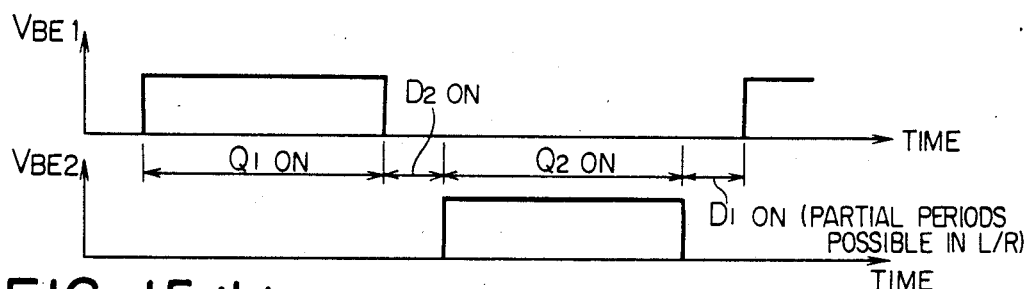
FIG. 15(a) and (b) show a current variation in accordance with periods ①~④ in FIG. 9(a).
Figure 15B:
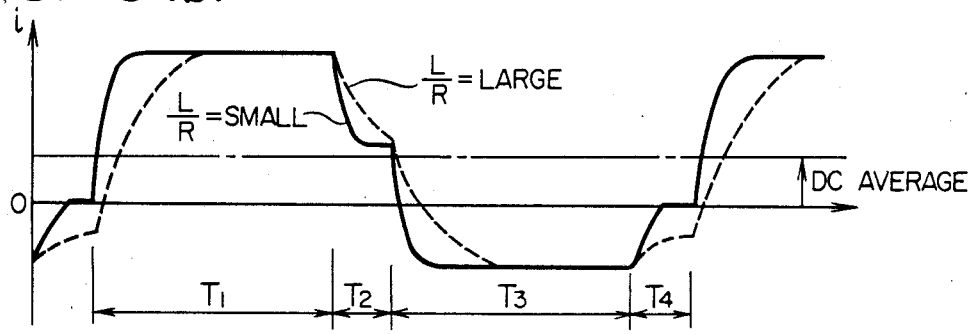

5. The current waveforms during the periods ①~④ may be summarized as shown in FIGS. 15(a), (b). There is shown the DC current component by $E_2$ therein.

During the dead time the above diodes $D_1$, $D_2$, the magnetic energy stored in the inductance L on the output side is regenerated and fitted to allow the the direct current derived from the power supply E to flow at all times and thereby prevent the terminals $U_2$, $U_2$ in the circuit being insulated from each other, so that the direct current derived from the power supply $E_2$ is always kept flowing therein.

FIG. 9(b) is a time chart showing the ON-time relation between the power transistors $Q_1 \sim Q_4$ in the full-bridge type circuit of FIG. 8.

In FIG. 9(b), ($\frac{1}{2}$)T indicates the half-period of the input pulse; $T_{12}$, $T_{21}$ the dead time during which both the power transistors $Q_1$, $Q_2$ are held off; and $T_{34}$, $T_{43}$ the dead time during which both the power transistors $Q_3$, $Q_4$ are held off.

In the above example of FIG. 7, the power transistors $Q_1$, $Q_2$ are alternately repeatedly turned on and off.

On the contrary in the circuit of FIG. 8, it has been so arranged that the ON-time width of the power transistors $Q_2$, $Q_4$ is shorter than that of the power transistors $Q_1$, $Q_3$. In other words, the ON-time of the power transistors $Q_1$, $Q_3$ is given by ($\frac{1}{2}$)T−($T_{12}$+$T_{21}$) or ($\frac{1}{2}$)T−($T_{34}$+$T_{43}$)

The dead time thus provided prevents a short between the terminals P, N when the power transistors $Q_1$, $Q_2$ or $Q_3$, $Q_4$ are simultaneously turned on. In this case, the dead time may be provided for the power transistors $Q_1$, $Q_3$ by holding the power transistors $Q_2$, $Q_4$ on and off every ($\frac{1}{2}$)T.

Figure 16:
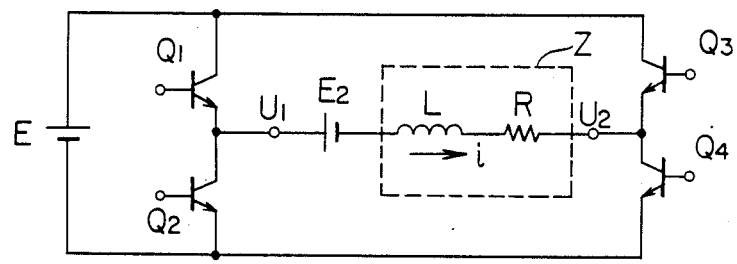
FIG. 16(a) is a diagram illustrating the construction of the inverter circuit of this invention.
FIG. 16(b) is a diagram illustrating the operation of the switching transistor of the circuit in FIG. 16(a).
FIG. 16(c) is a diagram illustrating the current variations of the circuit in FIG. 16.
Figure 16:
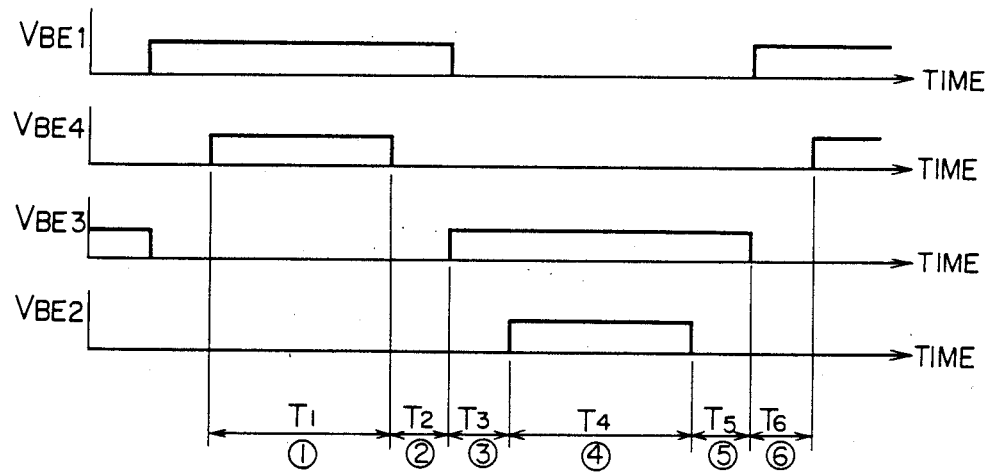
Figure 16:
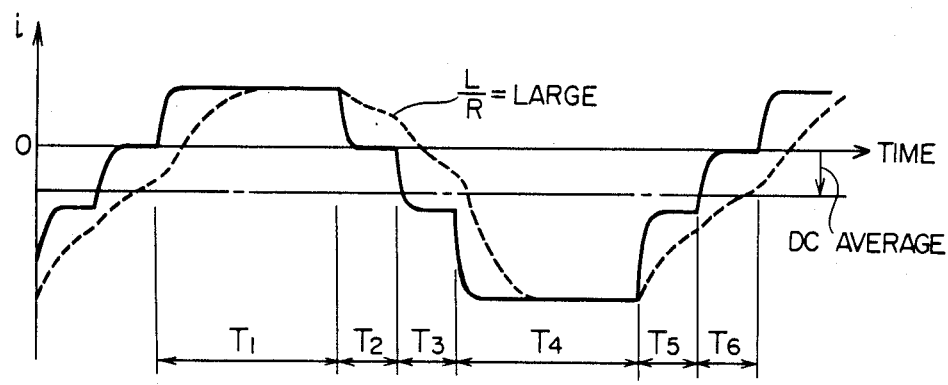

Referring to FIGS. 16(a), (b), (c), the wave forms of the currents flowing through the inverter circuit will be described.

Figure 17:
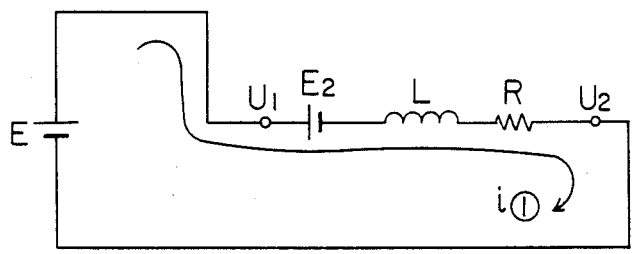
FIGS. 17 and 18 show the current flow and circuit characteristics in accordance with the period ① in FIG. 16(b).
Figure 18:
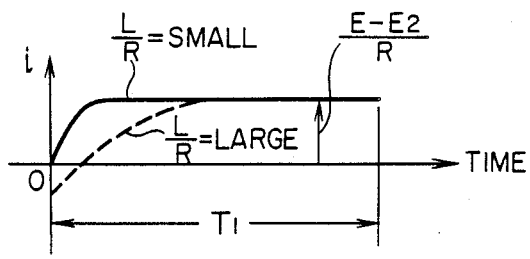

1. During the period ①, FIGS. 17, 18.
When $Q_1$, $Q_4$ are turned on, $i_1$ flows in accordance with the following equation:

$$i_{\textcircled{1}} = \frac{E - E_2}{R}(1 - \epsilon^{-\frac{R}{L}t}) + i_{\textcircled{6}}f\epsilon^{-\frac{R}{L}t}$$

where $i_{\textcircled{6}}$ designates the final value of the current in the preceding period.
Generally, $$i_{\textcircled{1}}f \simeq \frac{E - E_2}{R}, \text{ because } \epsilon^{-\frac{R}{L}t_1} \simeq 0$$

Figure 19:
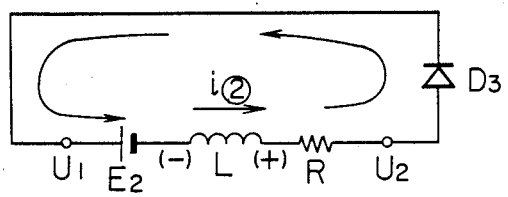
FIGS. 19 and 20 show the current flow and circuit characteristics in accordance with the period ② in FIG. 16(b).

2. During the period ②, FIGS. 19, 20.
Because of the magnetic energy contained in the inductance L, electromotive force is generated across the inductor with positive (+) and negative (−) polarity and the diode $D_3$ is turned on.

$$i_{\textcircled{2}} = -\frac{E_2}{R}(1 - \epsilon^{-\frac{R}{L}t}) + i_{\textcircled{1}}f\epsilon^{-\frac{R}{L}t}$$

The magnetic energy contained in the inductance L is expressed by $\frac{1}{2}Li_{\textcircled{2}}^2$.

(i) When L/R is small; $i_{\textcircled{2}} = 0$ at $0 \leq t \leq t_2$ halfway. Then $D_3$ is turned off. By the point of time $i_{\textcircled{2}} = 0$, the magnetic energy of L will have completely been released. The electromotive force of the inductor L thus becomes zero.

(ii) When L/R is large;
Even at $t = t_2$, $i_{\textcircled{2}} > 0$. In this case, $D_3$ is held on during the period $t_2$. Consequently, $$i_{\textcircled{2}}f =$$

$$\begin{cases} 0 & \text{(when } L/R = \text{small)} \\ -\frac{E_2}{R}(1 - \epsilon^{-\frac{R}{L}t_2}) + i_{\textcircled{1}}f\epsilon^{-\frac{R}{L}t_2} & \text{(when } L/R = \text{large)} \end{cases}$$

Figure 21:
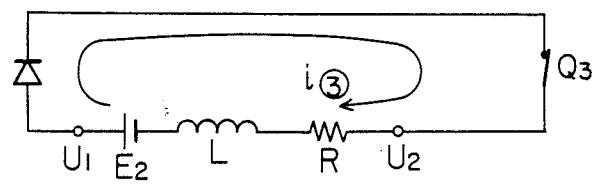
FIGS. 21 through 23 are showing the current flow and circuit characteristics in accordance with the period ③ in FIG. 16(b).
Figure 22:
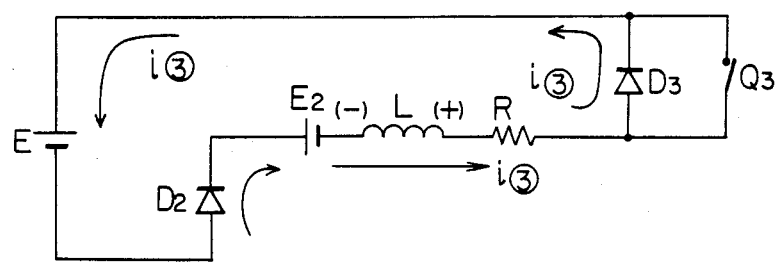

3. During the period ③, FIGS. 21, 22, 23. (i) When $i_{\textcircled{2}}f = 0$, $E_2$ as electromotive force causes current to flow as shown in FIG. 21 (curve 1 of FIG. 23).

$$i_3 = -\frac{E_2}{L}(1 - \epsilon^{-\frac{R}{L}t})$$

(ii) When $i_{\textcircled{2}}f > 0$, electromotive force because of the energy of L so develops as to provide such polarity as shown in FIG. 2 and allow allow the regenerative current to flow in accordance with:

$$i_3 = i_2 f\epsilon^{-\frac{R}{L}t} - \frac{E + E_2}{R}(1 - \epsilon^{-\frac{R}{L}t})$$

Figure 23:
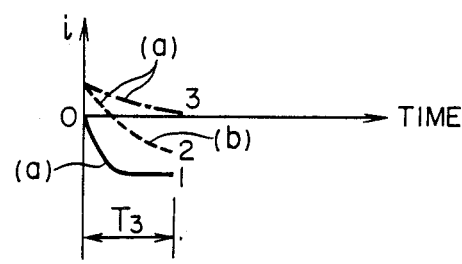

When $i_3 = 0$ during the $0 \leq t \leq t_3$ period then, $D_2$ is turned off and returned to the state (i) (curve 2 of FIG. 23). $D_2$ will be held on as shown by a curve 3 of FIG. 23, provided $i_{\textcircled{3}} > 0$ is maintained.

Figure 24:
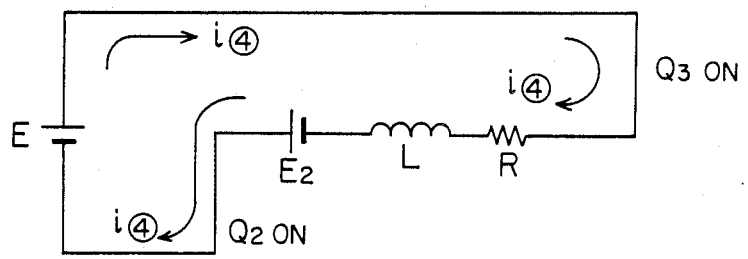
FIGS. 24 and 25 show the current flow and circuit characteristics in accordance with the period ④ in FIG. 16(b).
Figure 25:
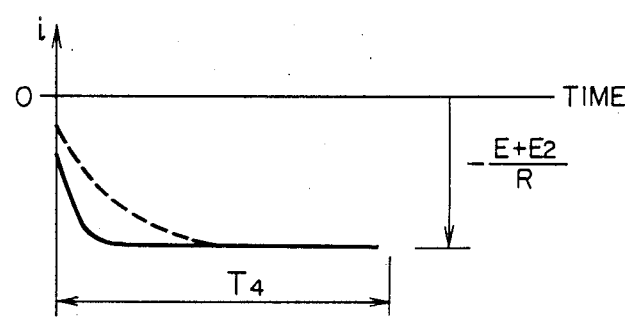

4. During the period ④, FIGS. 24, 25.
The final value $i_{\textcircled{3}}f$ during the above period 3 takes an individual value depending on the following state: solely (i) exists, (i)–(ii) or only (ii) is present, so that the final value may be determined.

The current during the period 4 is given by $$i_{\textcircled{4}} = -\frac{E + E_2}{R}(1 - \epsilon^{-\frac{R}{L}t}) + i_{\textcircled{3}}f\epsilon^{-\frac{R}{L}t}$$

$$i_{\textcircled{4}}f \simeq -\frac{E + E_2}{R} \text{ (normally because } \epsilon^{-\frac{R}{L}t_4} \simeq 0\text{)}$$

Figure 27:
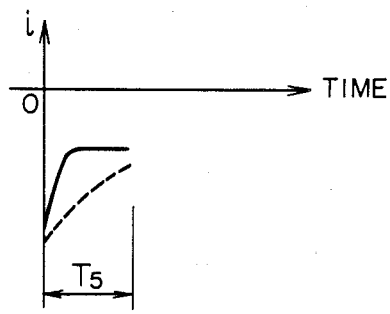

5. During the period ⑤, FIGS. 26, 27.
Since $Q_3$ is held on, $$i_{\textcircled{5}} = -\frac{E_2}{R}(1 - \epsilon^{-\frac{R}{L}t}) + i_4 f\epsilon^{-\frac{R}{L}t}$$

$$i_{\textcircled{5}}f = -\frac{E_2}{L}(1 - \epsilon^{-\frac{R}{L}t_5}) + i_4 f\epsilon^{-\frac{R}{L}t}$$

Figure 28:
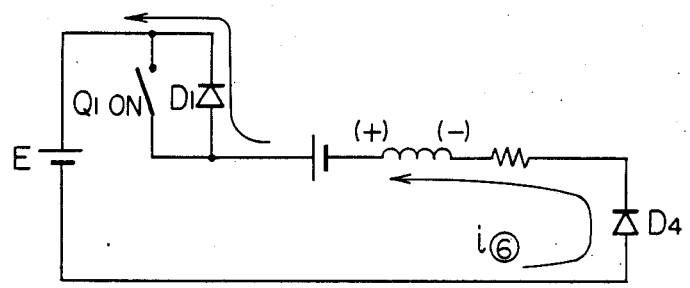
FIGS. 28 and 29 show the current flow and circuit characteristics in accordance with the period ⑥ in FIG. 16(a).
Figure 29:
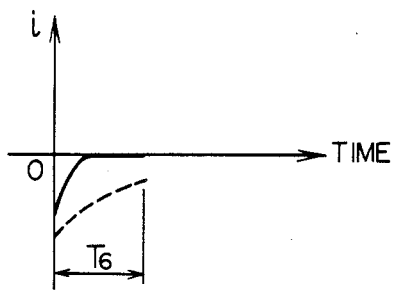

6. During the period ⑥, FIGS. 28, 29.

Because of the electromotive force of the inductor, $D_1$, $D_4$ are turned on.

$$i_{⑥} = \frac{E - E_2}{R}(1 - \epsilon^{-\frac{R}{L}t}) + i_{⑤}\epsilon^{-\frac{R}{L}t}$$

(i) When L/R is small, $i_{⑥} = 0$ at $0 \leq t \leq t_6$ halfway. Then $D_1$, $D_4$ are turned off (when $E > E_2$)

(ii) When L/R is large, $i_6 < 0$ at $t = t_6$. In this case, $D_1$, $D_4$ are held on during the period $t_2$.

7. In summarizing the above description, the current waveform shown in FIG. 16(c) is obtained with the mean value of the direct current generated in $E_2$.

The diodes $D_1 \sim D_4$ during the dead time, the magnetic energy stored in the inductance L on the output side is regenerated and simultaneously it is fitted therebetween so as to allow the direct current deriving from the power supply $E_2$ to flow therethrough at all times and thereby prevent the terminals $U_1$, $U_2$ in the circuit being insulated from each other, so that the direct current derived from the power supply $E_2$ is allowed to flow therethrough at all times.

Figure 20:
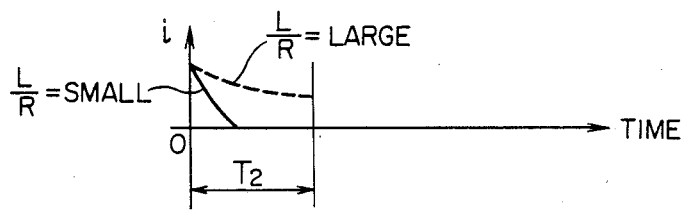
Figure 30:
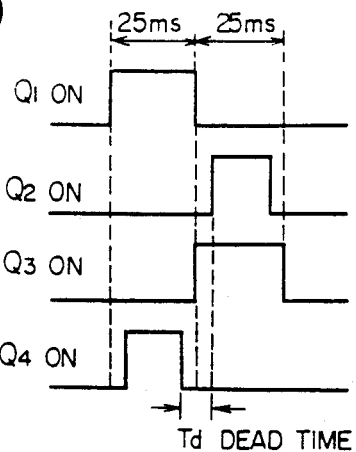
FIG. 30 is a diagram illustrating length of dead time of the transistors in the circuit of FIG. 3.

During the period $t_2$, the transistors $Q_1$, $Q_3$ are turned on and off respectively. As shown in FIG. 20, the direct current is not allowed to flow therethrough after the magnetic energy stored in the inductor L is completely released. As shown in FIG. 30, however, that period is ½ of the dead time Td and almost negligible as compared with the ON-time (25 ms) of the transistors $Q_1$, $Q_2$.

Figure 31:
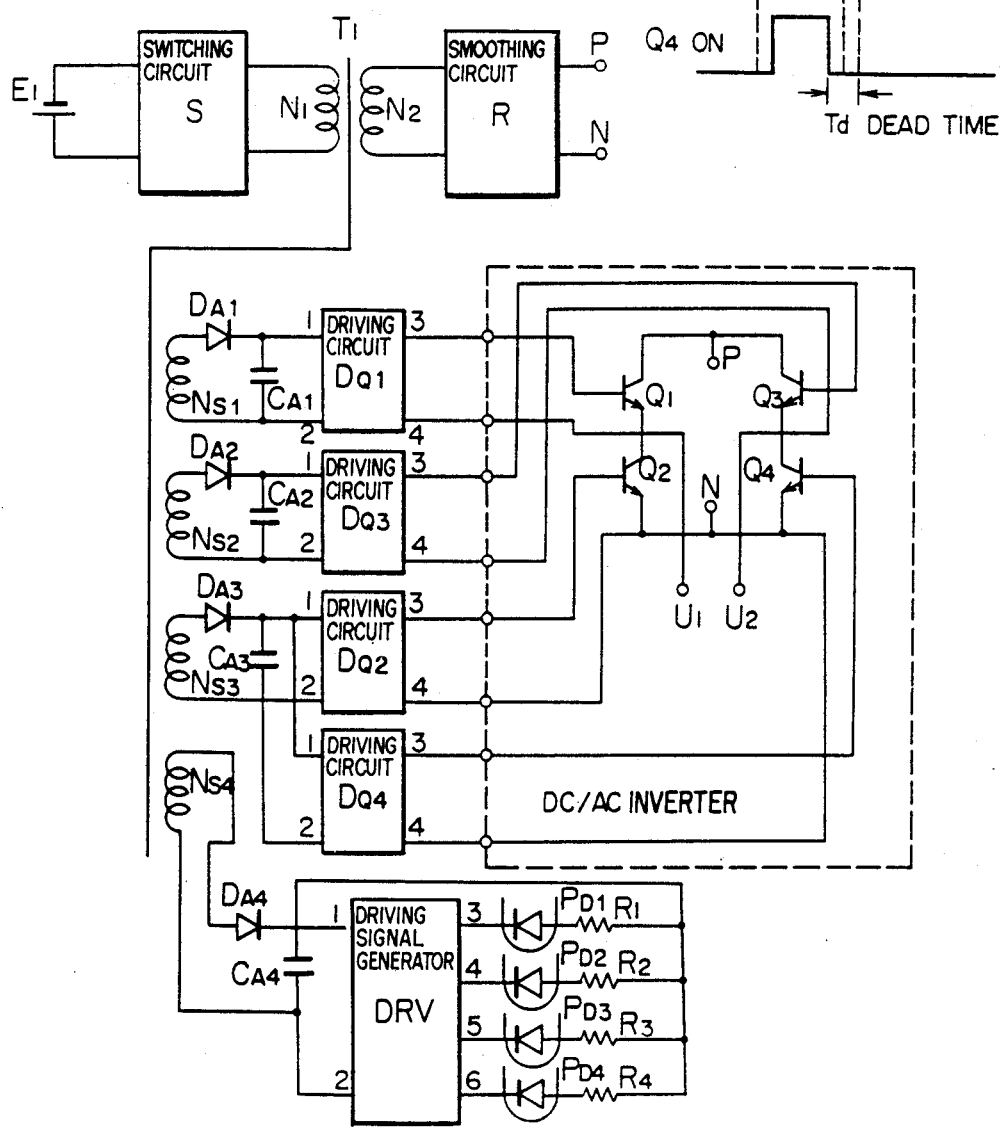
FIG. 31 is a circuit diagram showing a first configuration of the power supply circuit in the circuit of FIG. 8.

FIG. 31 is a circuit diagram showing a configuration of the power supply circuit for power transistors in the full-bridge type inverter of FIG. 8.

In the above example, power is obtained from a bias winding magnetically coupled to the primary winding of a converter transformer $T_1$.

In FIG. 31, there is shown an arrangement of a DC power supply $E_1$, a switching circuit of the above-described DC/AC converter, a transformer (converter transformer) $T_1$, the primary winding $N1_1$ of the transformer $T_1$, the secondary winding $N_2$ thereof, auxiliary winding $N_{s1} \sim N_{s4}$ magnetically coupled to the primary winding $N_1$ of the transformer $T_1$, rectifying diodes $D_{A1} \sim D_{A4}$, smoothing capacitors $C_{A1} \sim C_{A4}$, and driving circuits $D_{Q1} \sim D_{Q4}$ for driving transistors $Q_1 \sim Q_4$. The diodes $D_{A1} \sim D_{A4}$ are shown connected to the bases of the power transitors $Q_1 \sim Q_4$ of the full-bridge inverter shown in FIG. 8, respectively.

There is also shown therein a driving signal generator circuit DRV including input terminals 1, 2 connected to the auxiliary winding $N_{s4}$, output terminals 3, 6 respectively connected to photodiodes $P_{D1} \sim P_{D4}$ of a photocoupler, the photodiodes $P_{D1} \sim P_{D4}$ being connected to the input terminal 1 through current limiting resistors $R_1 \sim R_4$ of the inverter and used for superposing the direct current.

The power supply voltage $E_1$ in FIG. 31 is converted by the switching circuit S into square wave voltage, which is applied to the primary winding $N_1$ of the transformer $T_1$.

Transformed square wave voltages are respectively taken out of the auxiliary windings $N_{s1} \sim N_{s4}$ and rectified by the diodes $D_{A1} \sim D_{A4}$. The rectified voltages are smoothed by the capacitors $C_{A1} \sim C_{A4}$ and converted into DC voltages, which are supplied to the driving circuits $D_{Q1} \sim D_{Q4}$ and the driving signal generator circuit DRV.

The driving circuits $D_{Q1} \sim D_{Q4}$ receive the driving signals from the photocoupler and drive the power transistors $Q_1 \sim Q_4$.

The driving signals will subsequently be described.

The voltage across the capacitor $C_{A4}$ is supplied to the driving signal generator circuit DRV.

The signals in accordance with the time chart of FIG. 7 are generated in the driving signal generator circuit DRV (described later).

The signals are then sent out of the output terminals of the driving signal generator circuit DRV and used to drive the diodes $P_{D1} \sim P_{D4}$ of the photocoupler. The phototransistor forming a counterpart to the photodiode is arranged in each of the driving circuits $DQ_{Q1} \sim D_{Q4}$ (described later).

Figure 32:
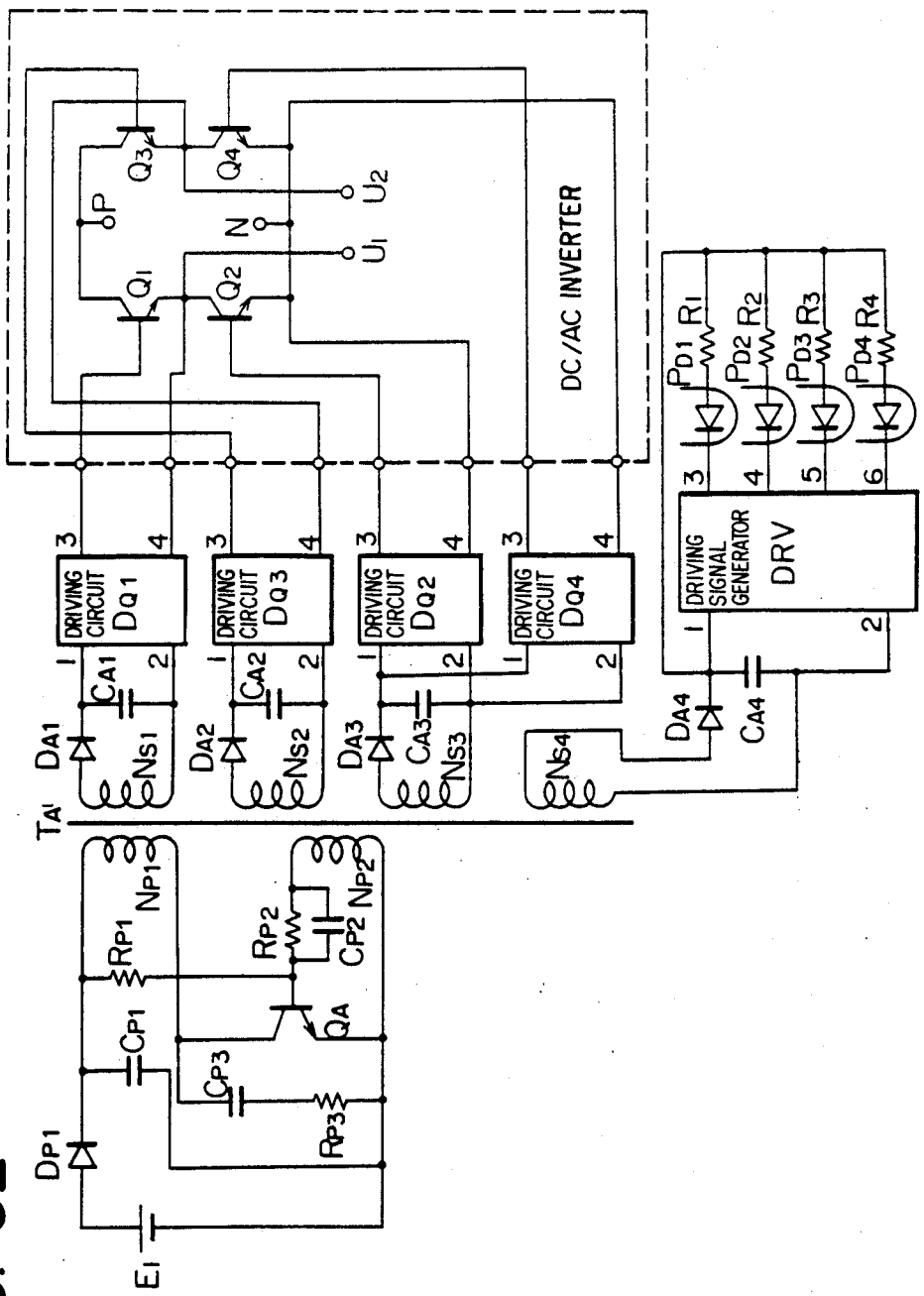
FIG. 32 is a circuit diagram showing a second configuration of the power supply circuit therein.

FIG. 32 is a circuit diagram showing another configuration of the power supply circuit for the power transistors.

A special switching circuit is provided in this case to generate power.

In FIG. 32, there is shown an arrangement of a DC power supply $E_1$, a switching transistor $Q_A$, a diode $D_{p1}$ for protecting the circuit when the input power is inadvertently reversed, a starting resistor $R_{p1}$ for starting the transistor $Q_A$, a base resistor $R_{p2}$ for the transistor $Q_A$, a speed-up capacitor $C_{p2}$, a capacitor $C_{p3}$ and a resistor $R_{p3}$ constituting a snubber circuit, a converter transformer $T_A$, the primary widing $N_{p1}$ of the converter transformer $T_a$, an auxiliary winding $N_{p2}$ for driving the switching transistor $Q_A$, the secondary windings $N_{s1} \sim N_{s4}$ of the converter transformer $T_A$, rectifying diodes $D_{A1} \sim D_{A4}$, smoothing capacitors $C_{A1} \sim C_{A4}$, and driving circuits $D_{Q1} \sim D_{Q4}$ respectively connected to the power transistors $Q_1 \sim Q_4$.

There is also shown therein a driving signal generator circuit DRV similar to what is shown in FIG. 31, the generator circuit including input terminals 1, 2 connected to the secondary winding to photodiodes $P_{D1} \sim P_{D4}$ of a photocoupler. The photodiodes $P_{D1} \sim P_{D4}$ are respectively connected to the input terminal 1 through current limiting resistors $R_1 \sim R_4$. An illustration will also be omitted of diodes which should respectively be connected between the collectors and emitters of the power transistors $Q_1 \sim Q_4$ of the inverter and used for superposing the direct current.

The power supply voltage $E_1$ in FIG. 32 is converted by the switching circuit $Q_A$ into square wave voltage, which is applied to the primary winding $N_{p1}$ of the transformer $T_A$.

Transformed square wave voltages taken out of the secondary windings $N_{s1} \sim N_{s4}$ and rectified by the diodes $D_{A1} \sim D_{A4}$. The rectified voltages are smoothed by the capacitors $C_{A1} \sim C_{A4}$ and converted into DC voltages, which are supplied to the driving circuits $D_{Q1} \sim D_{Q4}$, respectively.

Figure 33:
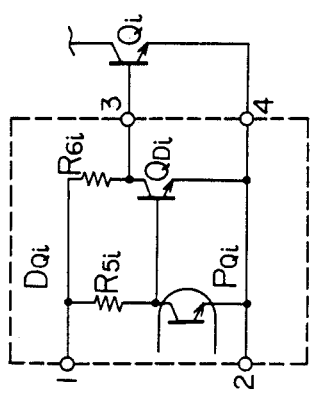
FIG. 33 is a circuit diagram showing a configuration of the driving circuit in the circuits of FIGS. 31 and 32.

FIG. 33 is a diagram showing a configuration of the driving circuits $D_{Q1} \sim D_{Q4}$ in FIGS. 31, 32. In the following description, i represents 1~4.

In FIG. 33, there is shown an arrangement of input terminals 1,2, output terminals 3, 4, a phototransistor $PQ_i$, resistors $R_5$ $_iR_6$ $_i$, a transistor $Q_{Di}$ and output terminals 3, 4.

The output terminals 3, 4 are connected between the base and emitter of the transistor $Q_1$ of the inverter I of FIG. 8.

Figure 12B:
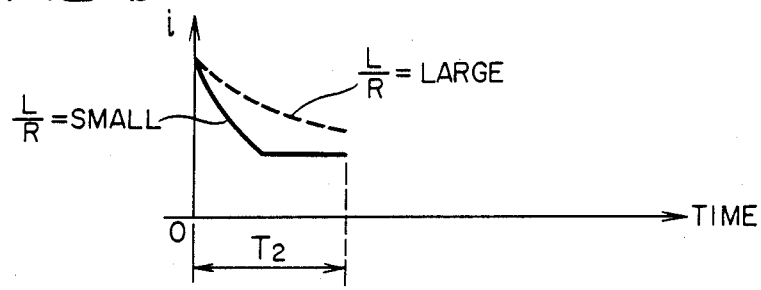

In FIG. 12, the phototransistor $P_{Qi}$ forms a counterpart to the photodiode $P_{Di}$.

The signal of the phototransistor $P_{Qi}$ is amplified by the driving transistor $QD_i$ and used to drive the power transistor $Q_i$ of the inverter I.

That is, the phototransistor $P_{Qi}$ is held on and the driving transistor $QD_i$ is held off when the photodiode $P_{Di}$ is turned on, whereby the power transistor $Q_1$ is turned on as the current flows in the power transistor $Q_i$ through (terminal 1)—(resistor $R_{6\ i}$)—(base of the power transistor $Q_1$).

To make the operational timing of the power transistor $Q_i$ conform to what is shown in FIG. 9(b), accordingly, the driving current of the photodiode $PD_i$ should be the one corresponding to the timing chart of FIG. 9(b).

A description will lastly be given of the configuration of the driving signal generator circuit DRV for causing the power transistor $Q_1$ (i=1~4) to operate in conformance with the timing chart of FIG. 9(b).

The driving signal generator circuit DRV consists of an oscillation circuit (a) for producing a high frequency signal, a logical operation circuit (b) for converting the high frequency signal into a low frequency signal, and a transmission circuit (c) for transmitting the signal prepared in the logical operation circuit to the driving circuit of the power transistor.

Figure 34:
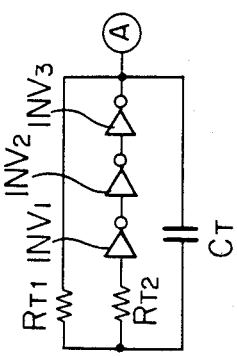

FIG. 34 is a diagram showing the configuration of the above oscillation circuit.

As shown in FIG. 34, the oscillation circuit consists of three inverters $INV_1 \sim INV_3$ connected in series, a resistor $R_{T1}$ connected to those inverters in parallel, a resistor $R_{T2}$ connected thereto in series and a capacitor $C_T$ connected thereto in parallel.

Figure 35:
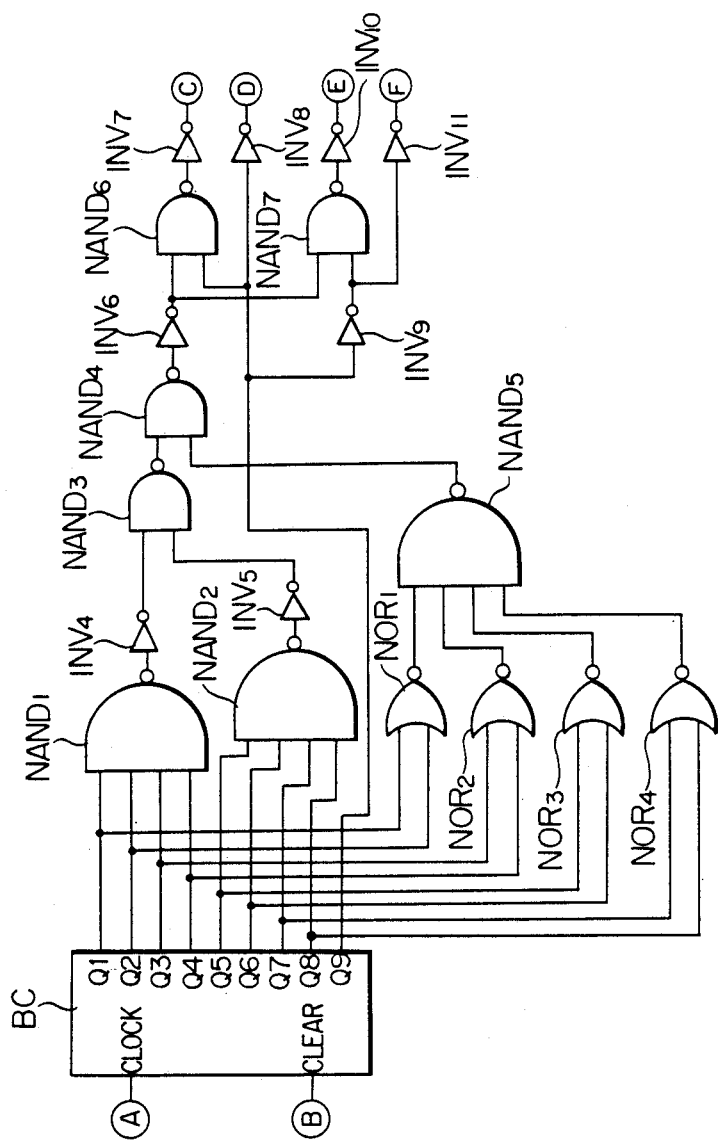
FIGS. 34 through 36 are diagrams showing configurations of blocks of the driving signal generator circuit in the circuits of FIGS. 31 and 32, respectively.

FIG. 35 is a diagram showing the configuration of the above logical operation circuit.

As shown in FIG. 35, the logical operation circuit consists of inverters $INV_4 \sim INV_{11}$, NAND gates $NAND_1\ NAND_7$, NOR gates $NOR_1 \sim NOR_4$, and a binary counter BC.

Figure 36:
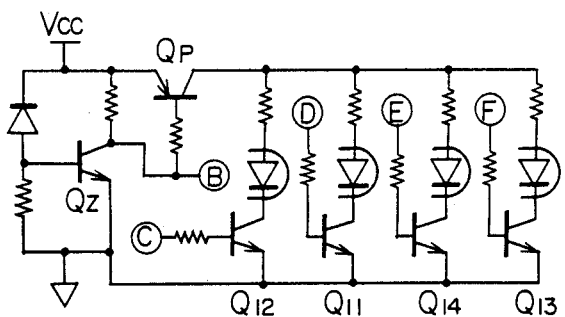

FIG. 36 is a diagram showing the configuration of the above transmission circuit.

As shown in FIG. 36, the transmission circuit consists of a Zener diode $D_2$, transistor $Q_Z$, $Q_P$, $Q_{11} \sim Q_{14}$.

Taking a case where the driving signals of the power transistors $Q_1$, $Q_2$ as an example, the operation of the driving signal generator circuit DRV will subsequently be described.

Each driving signal is sent out of the terminal C as the output of the inverter $INV_7$ and the terminal D as the output of the inverter $INV_8$ in the logical operation circuit of FIG. 35.

The terminal C is connected to the base of the transistor $Q_1$ and the terminal D is connected to the base of the transistor $Q_2$, whereby each terminal turns on each transistor at H level.

Figure 37:
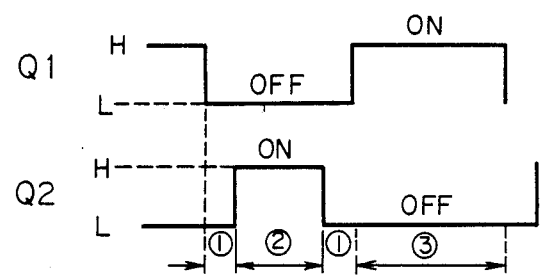
FIG. 37 is a diagram illustrating the operation of the driving signal generator circuit therein.

(1) When both the transistors $Q_1$, $Q_2$ are turned off (equivalent to the period ①) in FIG. 37):

In the binary counter BC of FIG. 35, the output $Q_3$ (bit at the highest position) should be set at H level, whereas all the continuous output bits $Q_1$ (the lowest bit) $Q_8$ should be set at H or L level.

(2) When the transistors $Q_1$, $Q_2$ are turned off and on, respectively (equivalent to the period of ② of FIG. 37):

The output $Q_9$ of the binary counter BC should be set at H level, whereas all the continuous output bits $Q_1 \sim Q_8$ should be prevented from being set at H or L level.

(3) When the transistors $Q_1$, $Q_2$ are turned on and off, respectively (equivalent to the period ③ FIG. 37:

The output $Q_9$ of the binary counter BC should be set at L level, whereas the outputs $Q_1 \sim Q_8$ may be set at any level.

(4) When both the transistors $Q_1$, $Q_2$ are turned on: This can never occur.

The above output patterns of the binary counter BC are obtained by dividing the high frequency signal the oscillation circuit inputs through the terminal A and converting the signal into a low frequency signal.

Figure 13B:
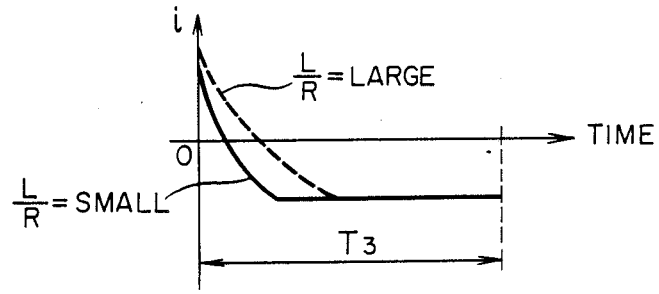

The period of the oscillation circuit shown in FIG. 13 is determined by $T = K \cdot R_{T1} \cdot C_T$ (where K=proportional constant)

As set forth above, the output of the ringer power supply has been defined as 20 Hz=50 ms.

The continuous output bits of the output $Q_1 \sim Q_9$ of the binary counter BC amount to $2^8 = 256$ counts of what is equivalent to one count is 50 (ms)/256 ≈ 195 (μs).

Accordingly, it is only necessary to set the values of the capacitor $C_T$ and the resistor $RT_1$ so that the period T of the oscillation circuit may become 195 μs. In the circuit of FIG. 36, further, the transistor $Q_2$ is turned on when the output of a power supply $V_{cc}$ of a logic IC becomes lower than the Zener voltage of the Zener diode $D_2$ (while the logic IC operates normally) and the clear terminal of the binary counter BC is set at Level and counting is thus started. Simultaneously, the transistor $Q_P$ of the transistors $Q_{11} \sim Q_{14}$ is turned on and the collectors connected to the power supply $V_{cc}$.

On the other hand, the driving transistors $Q_{11} \sim Q_{14}$ are separated from the power supply $V_{cc}$ when the supply voltage $V_{cc}$ becomes slower than the Zener voltage.

The reason for this is that, when the supply voltage $V_{cc}$ is low, the power transistor is prevented from being damaged by a short resulting from the malfunction of the logic IC allowing a signal with a different timing to be applied to the base thereof.

Figure 38:
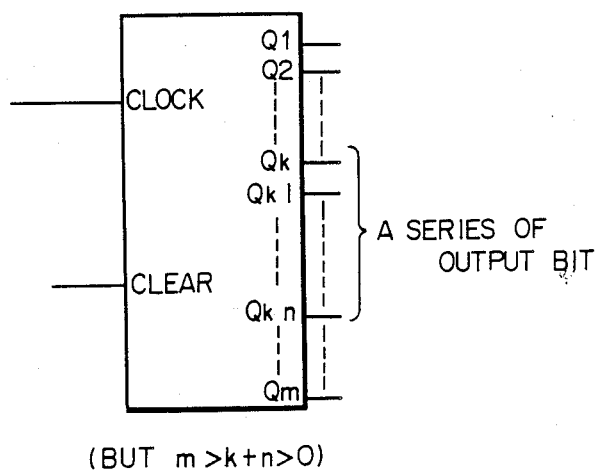
FIG. 38 is a diagram illustrating the binary counter in the driving signal generator circuit.

Referring to FIG. 38, the method of arranging the continuous output bits in the binary counter BC will be described.

Although the outputs $Q_1 \sim Q_9$ have been arranged in FIG. 35, the period of the driving signal of the power transistor may be increased or decreased by increasing or decreasing the number of output bits without changing the period of the oscillation circuit.

In that case, it is not always needed to select the bit $Q_1$ of the lowest rank and, provided $Q_k$ up to $Q_{k+n}$ halfway are arranged, counting of $2^{k+h-1}$ is provided. Then the time $Q_1$ up to $Q_k$ are counted is the dead time $T_c = 2^k \times T_0$ of the transistor $Q_1$, $Q_2$ or $Q_3$, $Q_4$ $T_0$ designates the period of the oscillation circuit.

Since the dead time of the ringer output is thus the sum of the dead time of the transistors $Q_1$, $Q_2$ and $Q_3$, $Q_4$, $T_d = 2T_0$ In the cases of the embodiment of FIGS. 31, 32, the driving signal generator circuit DRV is insulated from the driving circuits $D_{Q1} \sim D_{Q4}$. However, the driving signal generator circuit DRV and the $D_{Q2}$, $D_{Q4}$, may be held at the same potential by obtaining the power supplied to the driving signal generator circuit DRV from, e.g. $C_{43}$. With the arrangement thus made, the driving circuits $D_{Q2}D_{Q4}$ need not be insulated from the driving signal generator circuit DRV in terms of direct current, so that the photocoupler between the driving circuits $D_{Q2}$, $D_{Q4}$ and 4th and 6th output terminals of the driving signal generator circuit DRV may be omitted.

As set forth above, low frequency switching essential to the prior art on the primary side of the transformer of the DC/AC inverter can be dispensed with. In consequence, the size of the converter transformer for switching purposes and the current transformer for detecting current is reducible.

What is claimed is:

1. A power supply for a telephone exchange, comprising:

a first switching circuit for receiving and subjecting direct current to high frequency switching by means of a switching element;

a converter transformer having a primary winding connected to said first switching circuit, and a secondary winding;

a current transformer for detecting the current in said primary or secondary winding, and for feeding back the detected current to the first switching circuit to stabilize the output of said first switching circuit;

a smoothing circuit having an input and a single output, said input being connected to said secondary winding;

a second switching circuit connected to the single output of said smoothing circuit and used for switching the output current of said smoothing circuit by means of a transistor bridge including a plurality of transistors for being alternately turned on;

a direct-current bypassing diode connected between the input and output terminals of each of said transistors for returning reactive power to said secondary winding;

a driving signal generator circuit for generating a driving signal for setting timing to prevent the period during which each of said transistors is turned on from overlapping the period during which another of each of said transistors is subsequently turned on, wherein said driving signal generator circuit includes a binary counter; and a driving circuit for driving each of said transistors in accordance with said driving signal.

2. A power supply for a telephone exchange, comprising:

a first switching circuit for receiving and subjecting direct current to high frequency switching by means of a switching element;

a converter transformer having a primary winding connected to said first switching circuit, and a secondary winding;

a current transformer for detecting the current in said primary or secondary winding, and for feeding back the detected current to the first switching circuit to stabilize the output of said first switching circuit;

a smoothing circuit having an input and a single output, said input being connected to said secondary winding;

a second switching circuit connected to the single output of said smoothing circuit and used for switching the output current of said smoothing circuit by means of a transistor bridge including a plurality of transistors for being alternately turned on, wherein said second switching circuit has four transistors for forming a full bridge circuit;

a direct-current bypassing diode connected between the input and output terminals of each of said transistors for returning reactive power to said secondary winding;

a driving signal generator circuit for generating a driving signal for setting timing to prevent the period during which each of said transistors is turned on from overlapping the period during which another of each of said transistors is subsequently turned on; and a driving circuit for driving each of said transistors in accordance with said driving signal.

3. The power supply for a telephone exchange according to claim 1 or 2, wherein an inductive/capacitive (LC) filter is provided between the output of said second switching circuit and a load.

4. The power supply for a telephone exchange of claim 1 or 2 wherein said converter transformer includes a secondary auxiliary winding for providing electric power to said driving circuit, said drive signal generator circuit and said second switching circuit.

5. The power supply for the telephone exchange of claim 4 further including an auxiliary power supply, having a rectifying and smoothing circuit, connected to said secondary auxiliary winding, for providing electric power to said driving circuit, said drive signal generator circuit and said second switching circuit.

6. The power supply for a telephone exchange of claim 1 or 2 wherein said second driving signal generator circuit has means for generating said driving signal so as to eliminate the period during which said transistors, being connected in series, are simultaneously turned on.

7. The power supply for a telephone exchange of claim 1 or 2, where in the surplus power supplied from said second switching circuit to a load is returned to the secondary winding of said converter transformer.

8. A method of supplying power to a telephone exchange, comprising the steps of:

receiving and subjecting direct current to high frequency switching by means of a switching element in a first switching circuit;

transforming the output of said first switching circuit in a converter transformer having a primary winding connected to the output of said first switching circuit, and having a secondary winding;

detecting the current in said primary or secondary winding;

feeding back the current to the first switching circuit to stabilize the output of said first switching circuit;

smoothing the single output of said converter transformer in a smoothing circuit connected to said secondary winding;

switching a single output of said smoothing circuit in a second switching circuit having a transistor bridge including a plurality of transistors that are alternately turned on;

bypassing a direct current between the input and output terminals of each of said transistors by using a direct-current bypassing diode for returning reactive power to said secondary winding;

generating a driving signal for setting timing to prevent the period during which each of said transistors is turned on from overlapping is subsequently turned on, using a driving signal generator, wherein the step of generating a driving signal includes a step of binary counting using a binary counter; and driving each of said transistors in accordance with said driving signal using a driving circuit.

9. The method of supplying power to a telephone exchange of claim 8, further including the step of filtering the output of said second switching circuit with an inductive/capacitive (LC) filter.

10. The method of supplying power to a telephone exchange of claim 8 further including the step of providing electric power to said driving circuit, said drive signal generator circuit and said second switching circuit from a second auxiliary winding connected to said converter transformer.

11. The method of supplying power to the telephone exchange of claim 10 wherein said step of providing electric power to said driving circuit, said drive signal generator circuit, and said second switching circuit includes a step of rectifying and smoothing said electric power in a rectifying and smoothing circuit.

12. The method of supplying power to a telephone exchange of claim 8 wherein said step of generating includes a step of generating said driving signals so as to eliminate the period during which said transistors, being connected in series, are simultaneously turned on.

13. The method of supplying power to a telephone exchange of claim 8 further including the step of returning surplus power supplied from said second switching circuit to a load to said secondary winding of said converter transformer.

14. A power supply for a telephone exchange, comprising:
a first switching circuit for receiving and subjecting direct current to high frequency switching by means of a switching element;
a converter transformer having a primary winding connected to said first switching circuit, and a secondary winding;
a current transformer, coupled to said converter transformer and said first switching circuit, for detecting the current in said primary or secondary winding, and for feeding back the current to the first switching circuit to stabilize the output of said first switching circuit;
a smoothing circuit having an input connected to said secondary winding, and a single output;
a second low frequency switching circuit connected to the single output of said smoothing circuit and used for switching the output current of said smoothing circuit by means of a transistor bridge including a plurality of transistors for being alternately turned on;
a direct-current bypassing diode connected between the input and output terminals of each of said transistors for returning reactive power to said secondary winding;
a driving signal generator circuit for generating a driving signal for setting timing to prevent the period during which each of said transistors is turned on from overlapping the period during which another of each of said transistor is subsequently turned on, wherein said driving signal generator circuit includes a binary counter; and a driving circuit for driving each of said transistors in accordance with said driving signal.

15. A method for supplying power to a telephone exchange, comprising the steps of:
receiving and subjecting direct current to high frequency switching by means of a switching element in a first switching circuit;
transforming the output of said first switching circuit in a converter transformer having a primary winding connected to the output of said first switching circuit, and having a secondary winding;
detecting the current in said primary or secondary winding;
feeding back the current to the first switching circuit to stabilize the output of said first switching circuit;
smoothing a single output of said converter transformer in a smoothing circuit connected to said secondary winding;
switching the single output of said smoothing circuit in a second low frequency switching having a transistor bridge including a plurality of transistors that are alternately turned on;
bypassing a direct current between the input and output terminals of each of said transistors by using a direct-current bypassing diode for returning reactive power to said secondary winding;
generating a driving signal for setting timing to prevent the period during which each of said transistors is turned on from overlapping the period during which another of each of said transistors is subsequently turned on, using a driving signal generator circuit, wherein the step of generating a drive signal includes a step of binary counting using a binary counter; and
driving each of said transistors in accordance with said driving signal using a driving circuit.

16. A power supply for a telephone exchange, comprising:
a first switching circuit for receiving and subjecting direct current to high frequency switching by means of a switching element;
a converter transformer having a primary winding connected to said first switching circuit, and a secondary winding;
a current transformer, coupled to said converter transformer and said first switching circuit, for detecting the current in said primary or secondary winding, and for feeding back the current to the first switching circuit to stabilize the output of said first switching circuit;
a smoothing circuit having an input connected to said secondary winding, and a single output;
a second low frequency switching circuit connected to the single output of said smoothing circuit and used for switching the output current of said smoothing circuit by means of a transistor bridge including a plurality of transistors for being alternately turned on, wherein said second low frequency switching circuit has four transistors forming a full bridge circuit;
a direct-current bypassing diode connected between the input and output terminals of each of said transistors for returning reactive power to said secondary winding;

a driving signal generator circuit for generating a driving signal for setting timing to prevent the period during which each of said transistors is turned on from overlapping the period during which another of each of said transistors is subsequently turned on; and a driving circuit for driving each of said transistors in accordance with said driving signal.

* * * * *